J. S. HALL.
Cultivator.
No. 29,590. Patented Aug. 14, 1860.
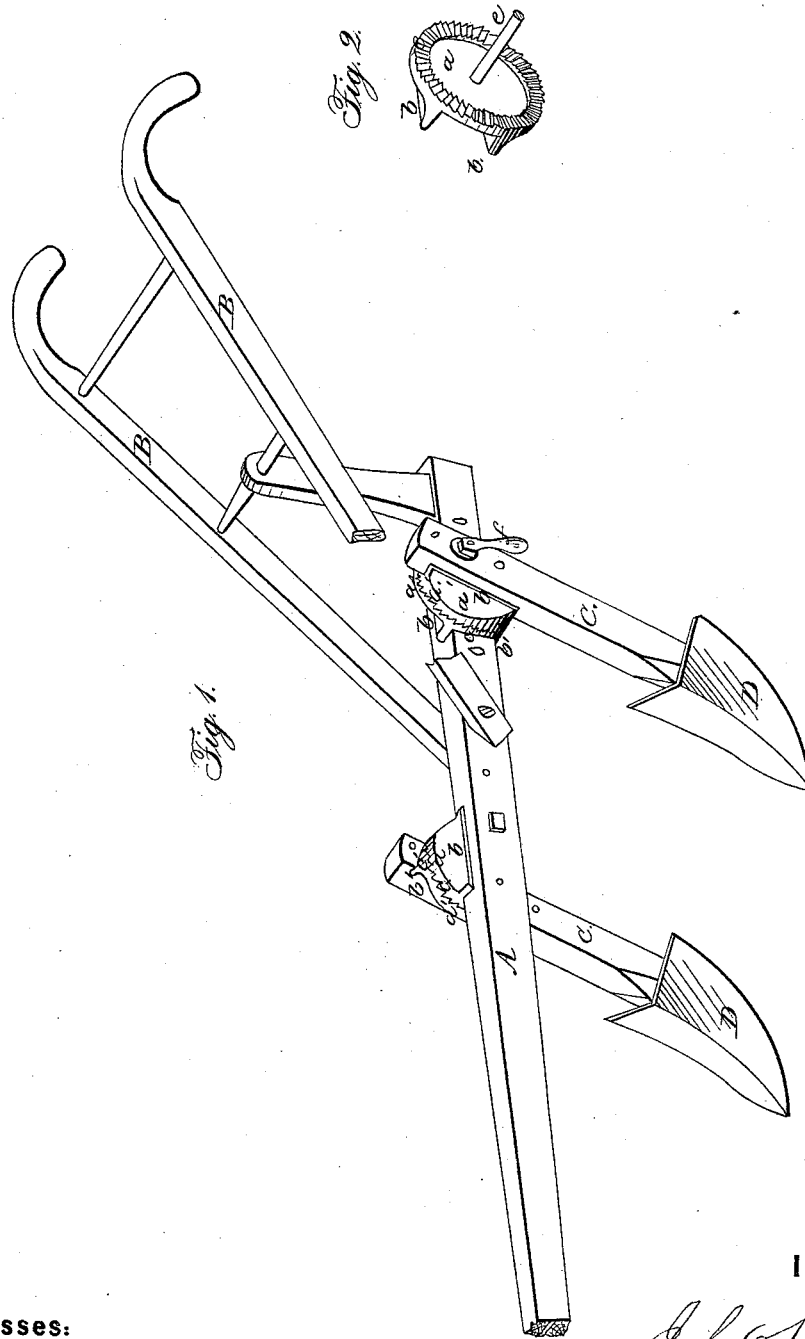
Witnesses:
E. Cohen
J. Hirsch
Inventor:
John S. Hall
per A. B. Stoughton
Attorney

UNITED STATES PATENT OFFICE.

JOHN S. HALL, OF WEST MANCHESTER, PENNSYLVANIA.

IMPROVEMENT IN PLOWS.

Specification forming part of Letters Patent No. 29,590, dated August 14, 1860.

*To all whom it may concern:*

Be it known that I, JOHN S. HALL, of West Manchester, in the county of Allegheny and State of Pennsylvania, have invented a new and useful Improvement in Plows, which may be used for many purposes in working or tilling soils; and I do hereby declare the following to be a full, clear, and exact description of the same, reference being had to the accompanying drawings, making a part of this description or specification, in which—

Figure 1 represents the plow in perspective, a portion of one of the handles being represented as broken away to show the parts behind it. Fig. 2 represents one of the ratchet and flanged plates or disks by which the standard is united to and adjusted upon the beam.

My invention consists in uniting the standard of a plow to the beam by means of ratchet and flanged plates, which admit of several adjustments that are very advantageous in implements of this kind, as will be hereinafter explained.

To enable others skilled in the art to make and use my invention, I will proceed to describe the same with reference to the drawings.

A represents the beam, and B the handles, of a plow made and united together in any of the usual well-known ways. $a$ and $a'$ are cast plates, having flanges $b$ $b'$ upon them and a series of ratchet-teeth, $c$ $c'$. These plates are alike, except in one particular—viz., that the flanges on the beam-plate $a$ are somewhat more remote from each other than those on the standard-plate $a'$—this difference being that of the usual difference in size between a plow beam and a standard. The flanges $b$ on the plate $a$ catch over the top and bottom of the beam, leaving the ratchet-face $c$ outward. The flanges $b'$ on the plate $a'$ catch over the sides of the standard C, its ratchet $c'$ facing that ($c$) on the beam. Now, when these two plates are brought up together with their ratchet-teeth interlocked, and a screw-bolt, $e$, passed through the beam, the plates, and the standard, the whole are firmly united together.

I have shown two shovel-plows, D D, as attached to the standards C C; but I can use any other form of plow just as well, and design fitting to the stocks such plows or mold-boards as the users prefer or desire. I can use, also, one, two, or more standards and plows on the beam without changing the characteristics of my invention.

I enumerate some of the advantages of this plow. In the first place, it may be a cotton-scraper, a plow, or a cultivator. It may be a right-hand or a left-hand scraper, plow, or cultivator by simply shifting the plows forward or back or onto opposite sides of the beam. The plows may be adjusted nearer to or farther from each other. They can be inclined more or less with regard to the beam, and be raised or lowered thereon to suit any object, person, or purpose; and, finally, for close packing for transportation or for storage, the standards C can be raised up into a position parallel with the beam, or nearly so, and there secured, in which position the plow takes up much less room. All these adjustments and changes and positions are due to the ratchet-plates by which the standard is united to the beam, for by running back the nut $f$ of the bolt $e$ until the two plates will spread far enough to disengage their ratchet-teeth, the standard may be turned entirely around on the bolt $e$, as on a pivot-pin, if it were necessary to do so, and by running up the nut again it could be held in any position within the circle which it describes. It will scarcely, however, ever be required to bring up the standards farther than the beam, and then only for transportation or stowage.

The whole plow is very cheap and simple, and, in consideration of its susceptibilities for so many purposes and changes, is highly valuable as an agricultural implement.

Though I have shown ratchet-teeth as the holding-surface between the plates, where the projecting portions of one fit into corresponding recesses in the other, to break, as it were, the joint between the plates, yet this joint may be broken and the two plates held from slipping by a pin, bolt, or other device passing through holes in the plates, and thus accomplish the same object. I deem, however, the ratchet-projections to be the most simple and efficient, but do not confine my invention solely to them, as other clamping or holding devices may be substituted for them, provided they are arranged on the sides of the beam and standard.

Having thus fully described the nature and object of my invention, what I claim is—

Uniting a plow-standard to a plow-beam by means of ratchet and flanged plates arranged on the sides of the beam and standard, so as to admit of folding up, substantially such as herein described and represented.

JOHN S. HALL.

Witnesses:
 A. B. STOUGHTON,
 E. COHEN.